2,850,468

REMOISTENABLE ADHESIVE COMPRISING POLYVINYL ACETATE, POLYVINYL ALCOHOL AND A PLASTICIZER AND METHOD OF PREPARATION

James W. Giggey, Niagara Falls, N. Y., assignor to E. I. du Pont de Nemours and Company, Wilmington, Del., a corporation of Delaware No Drawing. Application April 8, 1955
Serial No. 500,297

4 Claims. (Cl. 260—17.4)

This invention relates to the production of improved remoistenable adhesive composition based on polyvinyl acetate and certain types of polyvinyl alcohol.

There is a need for a remoistenable adhesive to replace the natural gums, starches, dextrins and the like which have undesirable properties such as blocking or sticking at high humidities and a tendency to curl or warp when used on labels, tapes or the like. Furthermore, when such natural materials are exposed in tape or other form to very low humidities they develop resistance to quick remoistening.

Polyvinyl acetate in emulsion form is useful as an adhesive but does not have good remoistenable adhesive properties even in view of the fact that dried films are water sensitive. Polyvinyl alcohols of varying grades of partial hydrolysis or saponification number are known to have good remoistenable adhesive properties. However, superior and more economical compositions, particularly of such a nature that solutions of high non-volatile content may be applied, are desired.

It is, therefore, an object of this invention to provide an aqueous adhesive composition which will combine the desirable properties for remoistenable adhesive purposes. More specifically the objective is to provide a composition which is easily applied to form a remoistenable adhesive deposit or film which will not curl to a serious or excessive and troublesome extent, be not affected too seriously by exposure to humid atmospheres, not block or stick and be easily remoistened after subjection to dry atmospheres. It is further an object to provide a composition which will deposit a film of sufficient plasticity so that it will not crack under varying dregrees of dehydration. It is a still further objective that the aqueous composition be stable and not separate into phases on standing. Other objects will be apparent as the invention is further described.

I have discovered that a superior aqueous adhesive composition capable of depositing a remoistenable film on paper and other surfaces results from adding a solution of a partially alcoholized or hydrolyzed grade of polyvinyl alcohol to a stable, high solids content aqueous emulsion of polyvinyl acetate together with plasticizing amounts of a plasticizer, specifically, butyl phthalyl butyl glycolate.

By way of example compositions were prepared as follows. Butyl phthalyl butyl glycolate (Santicizer B–16) was slowly added to polyvinyl acetate emulsion ("Elvacet" 81–900 containing at least 55% resin) with continuous stirring for a period of at least 30 minutes at room temperature. A water solution of a partially hydrolyzed grade of polyvinyl alcohol (such as "Elvanol" 51–05) was then added to the emulsion contining the plasticizer with continuous agitation until a smooth, homogeneous mixture resulted. This mixture has shelf stability and may be applied as an adhesive remoistenable coating to paper by any suitable means such as a roll coater, doctor blade or any conventional coating machine. In the laboratory it was found convenient to use Meyer rods (spirally wound on a steel rod) for coating the paper. The applied coating may then be conveniently and quickly dried at about 100–105° C. in an oven. The dried coating showed practically no dry track for the preferred compositions.

| Composition No. | Percent non-volatile | "Elvacet" 81–900 emulsion (55% resin) | "Elvanol" 51–05 solution (25% resin) | Santicizer B–16 | Starch solution, 20% Stayco "C" | Fiber tear as percent of area after set of— | | |
|---|---|---|---|---|---|---|---|---|
| | | | | | | 5 seconds | 10 seconds | 15 seconds |
| 1 | 55 | 100 | None | None | None | 0 | 0 | 0 |
| 2 | 57.5 | 100 | None | 6 | None | 0 | 0 | 10 |
| 3 | 56.2 | 100 | 4.4 | 6 | None | 13 | 46 | 90 |
| 4 | 54.4 | 100 | 11.0 | 6 | None | 84 | 91 | |
| 5 | 51.8 | 100 | 22.0 | 6 | None | 89 | 96 | |
| 6 | 48 | 100 | 44 | 6 | None | 96 | 98 | |
| 7 | 45.2 | 100 | 66 | 6 | None | 95 | 100 | |
| 8 | 41 | 100 | 110 | 6 | None | 96 | 100 | |
| 10 | 43.6 | 100 | 44 | 6 | 27.5 | 100 | | |
| 11 | 40.5 | 100 | 44 | 6 | 55 | 96 | | |
| 12 | 37.7 | 100 | 44 | 6 | 82.5 | 97 | | |
| 13 | 36.2 | 100 | 44 | 6 | 110 | 90 | | |
| 14 | 34.7 | 100 | 44 | 6 | 137.5 | 100 | | |
| 16 | 58.1 | 100 | [1] 5.5 | 6 | None | 100 | | |
| 17 | 57.5 | 100 | [2] 11 | 6 | None | 100 | | |

[1] Dry solid "Elvanol" 51–05 heated with mixture and 3 parts water added.
[2] Dry solid "Elvanol" 51–05 heated with mixture and 8 parts water added.

The table shows some compositions and their remoistenability which come within the scope of the present invention. The adhesive properties were determined in regard to setting time after remoistening and the fiber tear after 5 seconds. Where fiber tear was not 100% after 5 seconds this test was repeated on another sample after 10 seconds and if necessary after 15 seconds. It is, of course, evident that quick setting time is desirable.

The procedure used in making the fiber tear tests is as follows: Paper coated with the composition to be tested is cut into strips one inch by four inches and a marked off area of two square inches in remoistened. Water is applied by the fingers. The fingers are wet by pressing against a ⅝ inch thick wool felt saturated with water. The remoistened section is quickly laminated to a sheet of uncoated envelope paper stock. A slight amount of pressure is applied by a soothing stroke with the thumb. After a 5, 10 or 15 second setting period the glued strip is pulled off and the percent area of fiber tear or paper rupture is carefully estimated. Generally the average of four fiber tear tests is taken as the accepted result. Fairly good reproducibility can be obtained by this test procedure. At least about 75% fiber tear for a 5 to 15 second setting period is considered desirable for a remoistenable type adhesive for such uses as on gummed labels, postable stamps and envelopes.

"Elvacet" 81–900 is an aqueous dispersion of polyvinyl acetate having an average particle size of about 3 microns. It has a minimum non-volatile content of 55% and contains about 3% of a partially acetylated polyvinyl alcohol which is used as a protective colloid and dispersing agent. The polyvinyl acetate content of the adhesive composition of this invention may be between about 20% and 50% by weight. The preferred composition in the aqueous adhesive is between about 25% and 45%.

"Elvanol" 51–05 is a partially acetylated polyvinyl alcohol having a saponification number of 140–127, i. e., it is the product resulting from the hydrolysis of 87.7 to 89% of the acetoxy groups in polyvinyl acetate. The polyvinyl alcohol has a viscosity of about 4–6 centipoises at 20° C. when in an aqueous solution at a 4% concentration. While "Elvanol" 51–05 has been used in the examples it should be understood that any low viscosity partially acetylated polyvinyl alcohol is suitable for making high solids content aqueous adhesive compositions suitable for the purposes stated. In general, any polyvinyl alcohol having a viscosity of about 4 to 50 centipoises in 4% aqueous solution will be suitable, but a viscosity range between about 4 to 20 centipoises is preferred. Such polyvinyl alcohols will have a degree of hydrolysis between about 70 to 95% and this in turn will mean saponification numbers between about 297 and 61. Such polyvinyl alcohols will have high water solubilities at temperatures between about 0° C. and 50° C.

Stayco "C" starch (a product of A. E. Staley Co.) is a converted starch of medium viscosity which dissolves in water to the extent of about 25% by weight. Other types of soluble starches are also suitable, such as dextrin, starch ethers and others. Such starches can be used in partial substitution for polyvinyl alcohol in admixture with polyvinyl acetate provided they have remoistenable characteristics. Another limitation on the extent of the use of starch is the degree of water solubility. Up to 25% by weight of the total non-volatile content of the adhesive compositions may be water soluble starches. It may be advisable to add a suitable fungicide, such as "Mycoban" sodium propionate to adhesive compositions containing starch. In the case of "Mycoban" 0.1% by weight of the composition will be effective.

The amount of polyvinyl alcohol suitable for effectively modifying polyvinyl acetate to produce a good remoistenable adhesive will vary between about 3% and 50% by weight of the polyvinyl acetate resin. Such polyvinyl alcohol content is over and above that present in the polyvinyl acetate as a protective colloid or dispersant. The preferred ratio of polyvinyl alcohol to polyvinyl acetate is between about 5% and 25% by weight. The amount of the polyvinyl alcohol in the resin will in general be upwards of 2% of the liquid adhesive composition.

A plasticizer is an important component in any polyvinyl acetate based remoistenable adhesive to secure the desired advantageous properties. Butyl phthalyl butyl glycolate is the most useful plasticizer discovered. The grade used is known as Santicizer B-16 which is a water immiscible liquid at room temperatures. The plasticizer should be present in an amount between about 5% and 20% based on the weight of the polyvinyl acetate content. Preferably this ratio of plasticizer to resin should be between about 10% and 20%. Other plasticizers may be used such as a monomeric ester type, polyester or polymeric plasticizer or softening agent for polyvinyl acetate, provided it be relatively non-volatile at about 100° C., but butyl phthalyl butyl glycolate is preferred.

For commercial purposes the adhesive compositions should contain as little water as possible consistent with effective coating application procedures so that drying the applied film or coating to a non-tacky stage can be quickly accomplished. The compositions of the present invention are especially useful in this respect. It is possible to prepare compositions containing polyvinyl acetate, polyvinyl alcohol and plasticizer having a non-volatile content of upwards of 60% by weight. The limiting factor is the increasing viscosity associated with high solids content. It is possible to operate within the range of non-volatiles between about 35% and 65% by weight, but the preferred range is between about 40% and 60%.

I claim:

1. The method of making an adhesive composition which is remoistenable after drying which comprises adding to an aqueous dispersion of polyvinyl acetate from about 5% to 20% by weight based on said polyvinyl acetate of butyl phthalyl butyl glycolate, and an aqueous solution containing from about 3% to 50% by weight based on said polyvinyl acetate of a grade of polyvinyl alcohol made by the hydrolysis of between about 70% and 95% of the acetate groups of polyvinyl acetate, said adhesive composition containing from about 20% to 50% by weight of polyvinyl acetate.

2. The method of claim 1 wherein up to one-half of the weight of the polyvinyl alcohol is replaced by a water-soluble remoistenable starch.

3. An adhesive composition formed by the method of claim 1.

4. An adhesive composition formed by the method of claim 2.

References Cited in the file of this patent

UNITED STATES PATENTS

| | | |
|---|---|---|
| 2,398,344 | Collins et al. | Apr. 16, 1946 |
| 2,536,018 | Schoenkolz et al. | Jan. 2, 1951 |
| 2,611,756 | Pockel | Sept. 23, 1952 |
| 2,613,191 | McGaffin et al. | Oct. 7, 1952 |
| 2,614,087 | Turnbull | Oct. 14, 1952 |